United States Patent [19]

Lundberg

[11] Patent Number: 4,958,607
[45] Date of Patent: Sep. 25, 1990

[54] FOOT PEDAL ARRANGEMENT FOR ELECTRONIC THROTTLE CONTROL OF TRUCK ENGINES

[75] Inventor: Chester E. Lundberg, Sherwood, Oreg.

[73] Assignee: Williams Controls, Inc., Portland, Oreg.

[21] Appl. No.: 340,234

[22] Filed: Apr. 18, 1989

[51] Int. Cl.$^5$ ............... F02D 11/10; G05G 1/14
[52] U.S. Cl. ............................ 123/399; 74/513; 180/335
[58] Field of Search ............... 123/361, 399; 74/513, 74/560; 180/335

[56] References Cited

U.S. PATENT DOCUMENTS

| | | | |
|---|---|---|---|
| 3,958,677 | 5/1976 | Spanelis | 74/513 |
| 4,047,145 | 9/1977 | Schwehr | 338/67 |
| 4,087,776 | 5/1978 | Donato | 338/198 |
| 4,123,740 | 10/1978 | Palmer et al. | 338/67 |
| 4,528,590 | 7/1985 | Bisacquiro et al. | 338/153 |
| 4,718,380 | 1/1988 | Katayose et al. | 123/399 |
| 4,819,500 | 4/1989 | Musumiya et al. | 74/513 |
| 4,831,985 | 5/1989 | Mabee et al. | 123/399 |

FOREIGN PATENT DOCUMENTS 0099729 6/1985 Japan ............................ 74/513

OTHER PUBLICATIONS

Throttle controls for diesel engines, sales brochure-Williams Controls, pp. 2 & 3, 119742, 5/1988.

*Primary Examiner*—Willis R. Wolfe
*Attorney, Agent, or Firm*—Robert L. Harrington

[57] ABSTRACT

A foot pedal arrangement wherein a support structure is mounted to the front wall of a diesel powered truck cab. A spring biased spool is mounted to the support structure and is interconnected to a potentiometer. A foot pedal includes a projecting arm that is pivoted to the support structure. A flexible link connection between the foot pedal arm and the spool forces rotation of the spool with pivoting of the pedal. The connection is designed to translate the traditional pedal movement to the required spool rotation as needed for monitoring by the potentiometer.

8 Claims, 3 Drawing Sheets

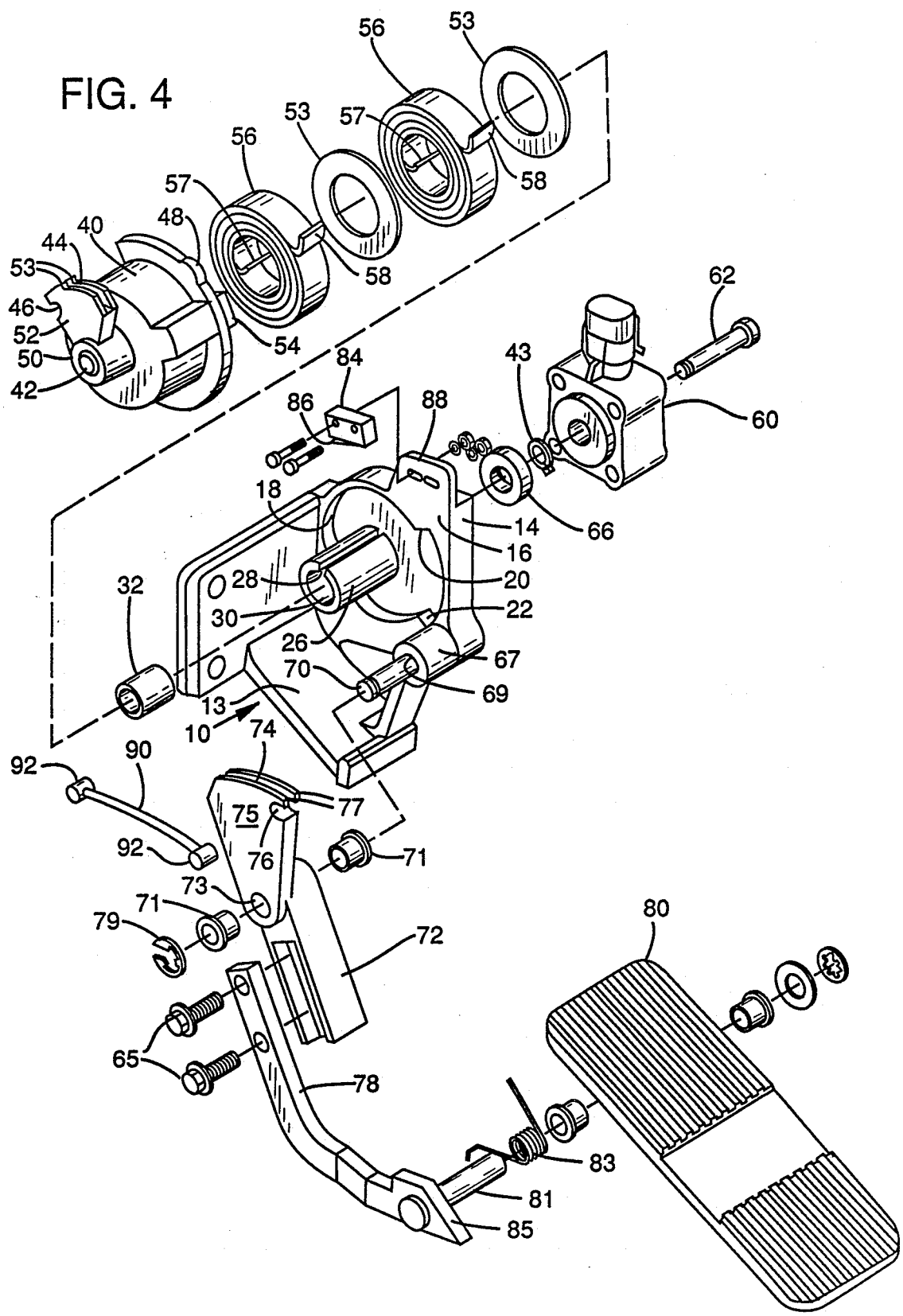

FOOT PEDAL ARRANGEMENT FOR ELECTRONIC THROTTLE CONTROL OF TRUCK ENGINES

FIELD OF THE INVENTION

The present invention relates to a foot pedal used for electronic throttle control in diesel engine powered trucks, and in particular it relates to a foot pedal that is mounted on the front wall of the truck cab in a manner that permits conventional foot pedal control.

BACKGROUND OF THE INVENTION

Controlling the rate of fuel dispensed to the cylinders, commonly referred to as throttle control, in diesel engines is accomplished by adjusting the output of the fuel pump. Throttle controls have evolved from a mechanical linkage directly connecting a foot pedal to the fuel pump, to an electronic linkage between the foot pedal and a computer, the computer then controlling the fuel pump.

Prior to the electronic inter-connection, a foot pedal was mechanically linked to the fuel pump and actuation of the foot pedal altered the output of fuel pumped by the fuel pump. The foot pedal was held in the home or idle position by a spring arrangement and the operator would merely depress the pedal to increase the fuel output of the pump thereby controlling the RPM and/or power output of the engine. The linkage of the pedal to the pump was proportional, the more the pedal was depressed, the more fuel was delivered to the cylinders. Fuel dispensing was then based purely on the demand of the operator.

The current trend in diesel engines is electronic control of the fuel pump output. The fuel pump is computer controlled and reacts to an input signal from the foot pedal. In the electronic or computer controlled system, the operator still utilizes a foot pedal. Instead of being mechanically linked to the pump, the pedal depression is monitored by a computer. The monitoring function is achieved through the use of a potentiometer. The potentiometer is rotated with depression of the pedal and provides an input signal to the computer.

The computer controls the fuel pump output based on input data from the potentiometer but it also factors in other data such as temperature, humidity, engine load, etc. to provide increased efficiency, economy of operation, and to reduce undesirable emissions to the atmosphere.

Initially the potentiometer was located in the engine compartment near the fuel pump. This was an undesirable arrangement due to the complex mechanical linkage required to connect the foot pedal to the potentiometer. The operating environment was also a problem in that it exposed the potentiometer to heat, oil and dirt that many believed caused premature failure of the potentiometer. The potentiometer was then incorporated in a foot pedal assembly structure that included a means for providing rotative motion of the potentiometer in reaction to depression of the pedal. This pedal assembly was floor mounted, and limited the design configuration and placement. Making adaptions to differing potentiometers that required a different degree of rotation created a major design change. At times, the modified design configuration required that operator convenience be compromised.

SUMMARY

The present invention, as in the prior art electronic throttle controls, utilizes a rotary potentiometer to monitor the foot pedal depression for the computer. However, the unique arrangement of the components and the method of providing rotary motion to the potentiometer allows a suspended pedal arrangement that provides operator convenience not previously available.

In the preferred embodiment of the invention, a specially configured support structure is mounted to the front wall of the truck cab. The front wall is here intended to mean the vertical or near vertical wall that is forward of the truck driver's feet and thus in front of the foot pedals (brake and accelerator pedals) that are manipulated by the driver. The invention is directed to the accelerator foot pedal and hereafter the term "foot pedal" will be used to refer to the accelerator foot pedal.

The support structure provides a pivot for the foot pedal (referred to as a suspended foot pedal as differentiated from a floor mounted foot pedal) and a pivotal mounting for a spring loaded spool that is connected to the potentiometer. An extended segment of the foot pedal acts as a lever and is connected through a cable to the spool. The manner of connection of the cable to the spool and foot pedal establishes a relative movement between the spool and foot pedal whereby the typical range of foot pedal movement translates into the required rotative movement of the spool and thus the potentiometer. The foot pedal, spool, potentiometer and their various components are sometimes collectively referred to as a "foot pedal arrangement".

The support structure includes a stop to limit the foot pedal movement and a safety or idle validation switch that is engaged by the spool to confirm idle mode, i.e. with the foot pedal in the fully retracted (non-depressed) state. The invention will be more fully understood with reference to the following detailed description and drawings.

DESCRIPTION OF THE DRAWINGS

FIG. 4 is a perspective exploded view illustrating the various components of the foot pedal arrangement of FIGS. 1, 2 and 3.

DESCRIPTION OF THE PREFERRED EMBODIMENT

Figure 3:
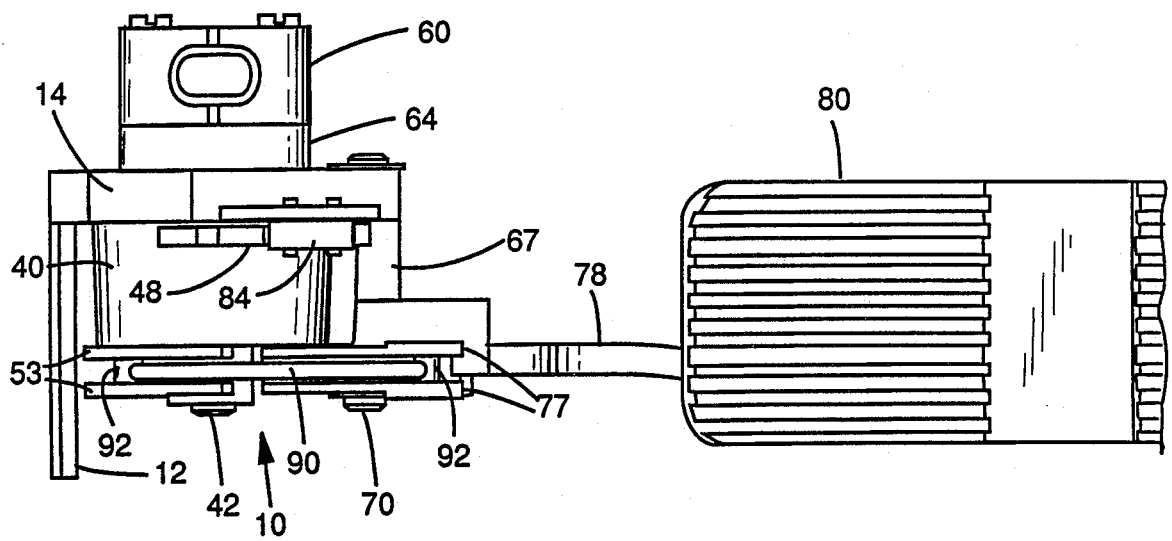
FIG. 3 is a top view of the foot pedal arrangement of FIGS. 1 and 2.

With reference to the drawings, the foot pedal arrangement 10 has a mounting base 12 configured to be rigidly attached to the front wall 11 in a cab of a diesel engine powered truck. Affixed to the base 12 is a plate-like support structure 14. The support structure 14 extends outwardly from the base 12 and has a formed recess 18 in side 16 (see FIG. 4). The formed recess 18 has radial limit stops 20 and 22. Extending outwardly out of the recess 18 and beyond the side 16 is a cylindrical hub 26, having a longitudinal groove 28 in its periphery. On the side opposite side 16 (see FIG. 3) is a pad 64 integral with structure 14, that is positioned in alignment with the hub 26. The hub 26, structure 14 and pad 64 have a common through bore 30. The outward end of hub 26 is counter-bored to accept bearing 32 (see FIG. 4) and the pad 64 is counter-bored to accept bearing 66. These features of support structure 14 provide the support and inter-connection for the spool and potentiometer to be later described.

A stud portion 67 extends from side 16 spaced outwardly from recess 18. A second bore 69 into the stud portion 67 of structure 14 is parallel to the bore 30. A pivot shaft 70 is supported in bore 69. Extending upwardly along side 16, above the recess 18, is a flange 88 that is slotted for adjustably mounting a micro-switch 84. Projected from the lower edge of base 12 is a brace portion 13 that also functions as a stop to limit pivoting of the foot pedal. The above describes the support structure. The foot pedal, spool and potentiometer supported on the support structure will now be described.

A spool 40, generally in the shape of an open ended cylinder and having a center cavity, is provided with a shaft 42 that has one end rigidly attached to a hub 50 at the closed end of the spool. The shaft 42 extends through and beyond the cavity of the spool 40. Projecting radially outward from the hub 50 and adjacent the closed end of spool 40 is a configured segment 52, and on the periphery of segment 52 is a carrier 44. The carrier 44 of segment 52 is a formed groove having parallel sides with the bottom surface of the groove curved, the curvature being an arc concentric (coaxial) to the shaft 42. The ends 53 of the parallel sides have notches 46.

A shaped cam 48 on the periphery of the spool 40 is formed near the open end of spool 40. A lobe 54 projects outwardly from the cylindrical surface of the spool 40. As illustrated, the lobe 54 extends the length of the spool 40. The lobe 54 has a slot that is open to the cavity of the spool and is arranged to receive the external flanges 58 of a pair of torque springs 56. Spacer washers 53 separate the springs from each other and from the inner face of the recess 18.

The foot pedal includes a pivot arm 72 having a bore 73. Projecting radially from the bore 73 is a configured segment 75, and on the periphery of segment 75 is a carrier 74. The carrier 74, like carrier 44, is a formed groove having parallel sides, with the bottom of the groove curved, the curvature being an arc concentric (coaxial) to the bore 73. The ends 77 of the parallel sides have notches 76.

Figure 1:
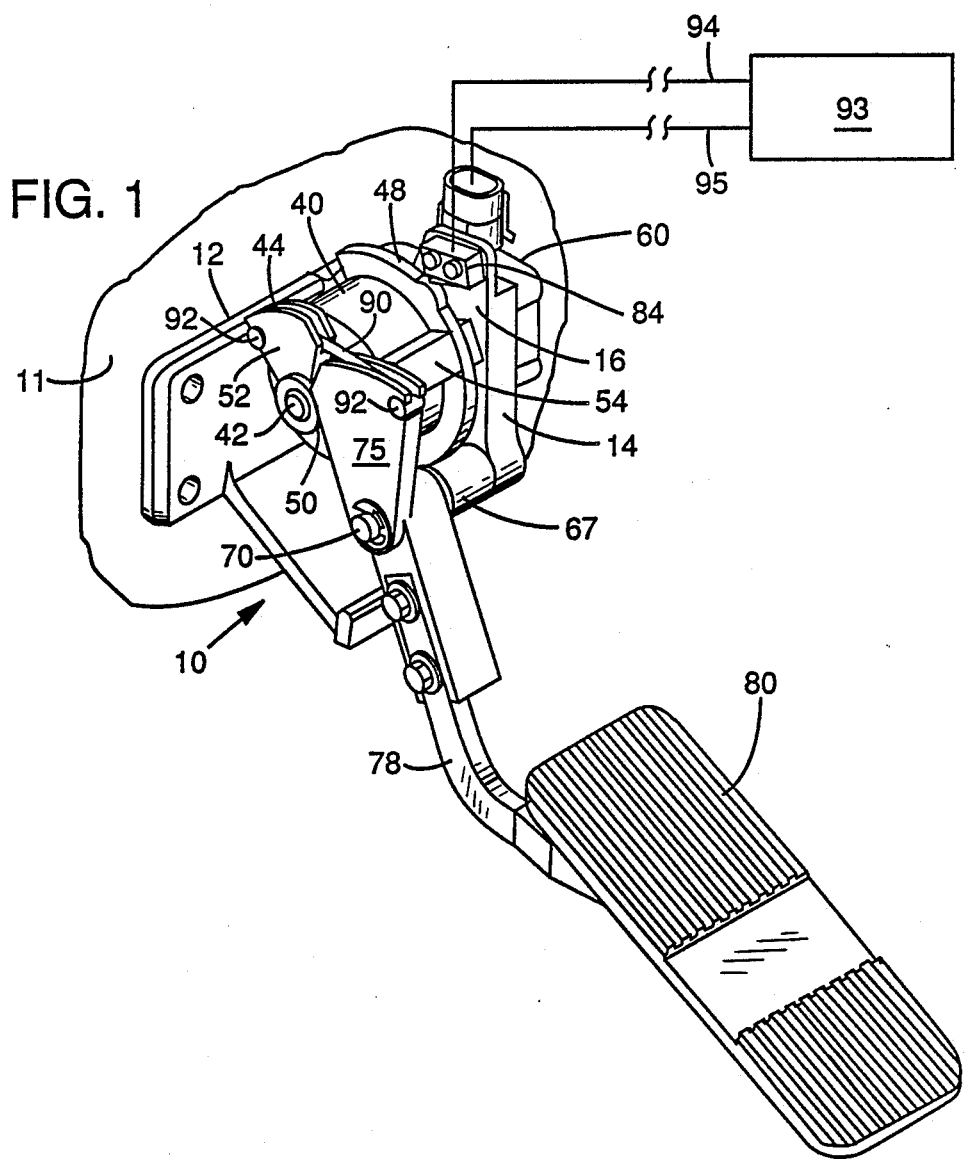
FIG. 1 is a perspective view of a foot pedal arrangement in accordance with the present invention.
Figure 2:
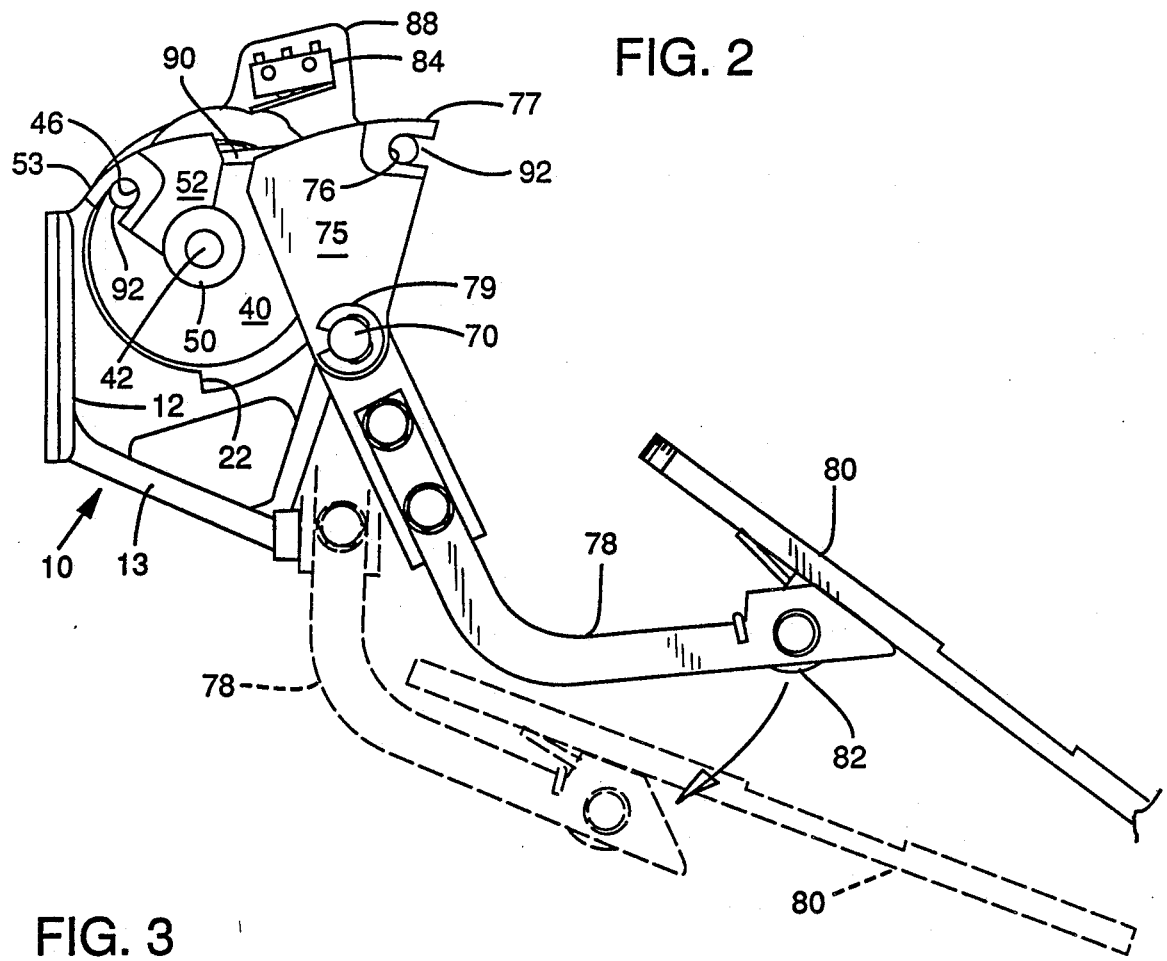
FIG. 2 is a side view of the foot pedal arrangement of FIG. 1.

Extended from pivot arm 72 (attached by screws 65) opposite to the extension of segment 75 from bore 73, is a pedal arm 78. A foot pedal 80 is attached to arm 78 by a pin 81 projected through the arm 78 and receiving lugs 82 on the bottom of pedal 80 (see FIG. 2). A spring 83 urges the pedal 80 against an angled landing 85 on arm 78.

A flexible link, in the form of a cable 90, has dowels 92 affixed transversely at each of its ends. The dowels 92 engage the notches 46, 76 of the carriers 44 and 74 with the cable fitting in the grooves of the carriers thereby providing a linkage between the spool 40 and the foot pedal components (72, 78, 80).

As previously explained, the spool 40 has spirally wound tension springs 56 and washers 53 inserted within the cavity of the spool, with the outer flanges 58 of the springs engaging the slot of the lobe 54. The inner flanges of the springs 56 fit in the groove 28 of the hub 26. The spool shaft 42 is rotatably mounted in bearings 32 and 66 and is axially retained by a retainer 43. The shaft 42 extends into and couples with the input shaft of the potentiometer 60 that is attached to pad 64 by fasteners 62.

The springs 56 apply a yieldable rotative force to the spool 40, with the rotation of spool 40 limited by the engagement of the lobe 54 against the limit stop 20. This rotative position of the spool and, therefore, the rotative position of the potentiometer (since they are coupled), is referred to as the home position or the idle mode.

Adjustably mounted to the flange 88 by threaded fasteners is a micro-switch 84. The micro-switch operating lever 86 is aligned and engages the cam 48 of spool 40. When the spool 40 and potentiometer 60 are in the home or idle mode, the operating lever 86 will have actuated the micro-switch thereby providing an idle mode confirmation signal to the computer by connecting line 94.

The pivot arm 72 is rotatably bearing mounted on the pivot shaft 70 projected into bore 69 of structure 14, by bearings 71. The pivot shaft 70 has a retainer 79 to secure the pivot arm 72 on the shaft 70.

The carriers 44 and 74 are in alignment one with the other and the cable 90 is aligned in the grooves of the carriers with the dowels 92 slidably engaging the notches 46 and 76 of the carriers.

In operation, the foot pedal 80 is depressed, pivoting the pivot arm 72 about the pivot shaft 70. This pivoting action provides motion to the carrier 74 which is transmitted to the carrier 44 through the cable 90, causing a rotative motion of the spool 40 which in turn rotates the potentiometer 60. Note that a limit stop 22 in the recess 18 limits the rotation of the spool 40. The degree of rotation between limit stops 20 and 22 is dictated by the rotational requirement needed by the potentiometer to have a minimum to maximum output value.

Depressing the pedal fully rotates the spool and the potentiometer the maximum degrees allowed, the rotation being limited by the limit stop 22. This maximum rotation provides a signal to computer 93 through a connecting line 95 for maximum engine RPM. The pedal depression is infinitely adjustable from idle to maximum RPM. The rate of the RPM of the engine is proportioned to the pedal displacement, i.e. due to computer response to the monitoring of the spool rotation.

The pivot arm in the preferred embodiment illustrated has an ideal angular motion of 27 degrees. This is considered to be the best arrangement for operator utilization, safety and comfort.

The rotational requirement of the potentiometer 60 determines the amount of angular rotation of the spool 40. In the preferred embodiment, the potentiometer requires a rotation of 53 degrees. Therefore, the limit stops 20 and 22 are spaced angularly at fifty-three degrees plus a compensation in consideration of the width of the lobe 54. The ratio of the radial distance of the curved surface of carrier 74 engaged by the cable 90 to the radial distance of the corresponding curved surface of carrier 44 is therefore two-to-one, respectively. The additional degree of rotation that would be imparted to the spool is attributed to the "lost motion" of the connecting members of the flexible link and the carriers due to the allowable tolerance of fit.

The capability of adjusting the aforementioned ratio of the radii and the angular displacement of the limit stops provides an electronic throttle control that is easily adapted to differing potentiometers.

The configuration of the support structure provides a suspended type pedal design, unlimited in its configuration.

The micro-switch 84 provides an idle mode confirmation signal that is a safety feature in the event of potentiometer failure. Regardless of the signal generated by the potentiometer, with the foot pedal in the home position, the switch 84 signals the computer 93 through the connecting line cable 94 of the desired idle mode, thereby overriding the potentiometer.

Dual springs 56 are provided for safety in the event one of the springs breaks. The torque applied by one spring is adequate to return the spool to the home or idle position.

Other arrangements will be apparent from the above disclosure. Accordingly, the scope of the invention is not limited to the drawings and descriptions but is determined by the appended claims.

What is claimed is:

1. a foot pedal arrangement for controlling the throttle of an internal combustion engine in a vehicle comprising; a configured integral support structure having a base adapted for mounting onto the upright wall of a vehicle cab, a foot pedal pivotally mounted on the support structure, a throttle controlling computer, and monitoring means connected to the computer, said monitoring means mounted to the support structure, linear coupling means coupling the monitoring means and foot pedal whereby pivotal movement of the foot pedal is linearly monitored by the monitoring means for proportionate input to the computer for controlling engine throttle, said foot pedal, monitoring means and coupling means being mounted on the support structure for unitized mounting thereof onto the upright wall of a vehicle cab.

2. A foot pedal arrangement for controlling a throttle of an internal combustion engine in a vehicle, comprising;
   a support structure adapted for mounting onto the upright wall of a vehicle cab;
   a foot pedal pivotally mounted on the support structure;
   a throttle controlling computer;
   monitoring means for monitoring pivotal movement of the foot pedal connected to the computer, said monitoring means mounted to the support structure; and
   coupling means for coupling the monitoring means and foot pedal;
   said monitoring means comprising a potentiometer and a rotatable spring biased spool;
   said spool connected to the potentiometer whereby rotation of the spool is monitored by the potentiometer, said spool having minimum and maximum rotative limits and said foot pedal having minimum and maximum pivotal positions, said foot pedal pivotal movement between minimum and maximum positions being pivoted through a determined angle that is less than the rotative movement between minimum and maximum limits of the spool, and said coupling means including translation means to proportionately translate the minium to maxium movement of the foot pedal to corresponding minimum to maxium movement of the spool.

3. A foot pedal arrangement as defined in claim 2 wherein the translation means comprises; a flexible link between the spool and foot pedal, the effective connection of the flexible link to the spool being at a first determined distance from the axis of rotation of the spool, and the effective connection of the flexible link to the foot pedal being at a second determined distance from the axis of pivoting of the foot pedal, said first determined distance and second determined distance having a ratio corresponding to the ratio of the angle of movement from minimum to maximum for the foot pedal and the spool, respectively.

4. A foot pedal arrangement as defined in claim 3 wherein the effective connections of the flexible link are at a curved carrier surface provided on each of the spool and foot pedal, the curved surfaces formed as the radial distances corresponding to the first determined distance and second determined distance for the spool and foot pedal respectively, said flexible link riding over the carrier surfaces whereby the flexible link engages a point of tangency on each of the curved carrier surfaces throughout the minimum to maximum movement of the spool and foot pedal.

5. A foot pedal arrangement as defined in claim 4 wherein the spool is rotatably mounted on the support structure forward of the pivotal movement of the foot pedal, said foot pedal including a pedal portion and an arm portion, the pivotal connection being to the arm portion and an arm extension projected beyond the pivotal connection and the carrier surface of the foot pedal provided at the arm extension whereby pivoting of the pedal portion forward forces pivoting of the arm extension rearward to draw the flexible link and force rotation of the spool.

6. A foot pedal arrangement as defined in claim 2 wherein said minimum position of the pedal and accordingly said minimum limit of the spool defines a desired idle mode of the engine, a detecting means mounted to the support structure detects the minimum rotative position of the spool, said detecting means directly connected to the computer to indicate the desired idle mode regardless of the input from the potentiometer.

7. A foot pedal arrangement indirectly controlling the throttle of an internal combustion engine that is directly controlled by a computer comprising;
   a configured support structure including a base attached to an upright wall of an internal combustion engine powered truck, a plate-like support projected from the base,
   a spool rotatably mounted to one side of the plate-like support and defining an axis of rotation, a shaft fixed to the spool and projected through a bore in the plate-like support, a potentiometer connected to the spool shaft on the opposite side of the plate-like support, stop limits on the support structure defining minimum and maximum rotative positions of the spool, and spring biasing means for biasing the spool toward the minimum position,
   a foot pedal arm pivotally attached to the plate-like support and defining a pivotal axis parallel to and spaced from the axis of rotation of the spool, said arm having a lower portion extended below the pivot and an upper portion extended above the pivot, a foot pedal mounted to the lower portion,
   a first curved carrier portion on the spool defined by a radius projected from the axis of rotation of the spool, a second curved carrier portion on the upper portion of the foot pedal arm defined by a radius projected from the pivotal axis of the arm, a flexible link attached to the spool and upper portion of the arm, said flexible link extended over the first and second curved carrier portions, said first and second curved carrier portions relatively arranged whereby the flexible link is projected as a tangent to both curved portions throughout rotation of the spool between minimum and maximum positions, and a computer, said potentiometer connected to the computer, said potentiometer monitoring the rotative positions of the spool shaft generated by rotation of the spool between minimum and maximum positions.

8. A foot pedal arrangement as defined in claim 7 wherein a detector on the plate-like support detects the minimum position of the spool, said detector connected to the computer to input the minimum position of the spool independent of the potentiometer.

* * * * *